United States Patent Office 3,382,293
Patented May 7, 1968

3,382,293
POLYOXYMETHYLENE BLENDED WITH PHENOLIC NOVOLAC
Martin B. Price, Berkeley Heights, N.J., assignor to Celanese Corporation, a corporation of Delaware
No Drawing. Continuation of application Ser. No. 172,791, Feb. 12, 1962. This application Sept. 2, 1966, Ser. No. 577,082
6 Claims. (Cl. 260—838)

ABSTRACT OF THE DISCLOSURE

Thermosetting blends capable of forming a tough resilient product are formed from certain relatively stable normally thermoplastic oxymethylene polymers or copolymers, and from about 15 to about 70 percent based on the total weight of the blend of certain materials capable of reaction with formaldehyde. Thermoset products formed from the blends are supported by a core of high molecular weight oxymethylene polymer, and are free from brittleness which is commonly characteristic of thermoset resins.

CROSS REFERENCE TO RELATED APPLICATION

The present application is a continuation of Ser. No. 172,791, filed Feb. 12, 1962, now abandoned.

This invention relates to resin compositions and particularly to compositions comprising moldable oxymethylene polymers having successively recurring oxymethylene groups.

Plastic material as is well known falls into two general classes, thermoplastic and thermosetting. Molded articles prepared from thermoplastic materials are susceptible to deformation when subjected to elevated temperatures. Molded articles prepared from thermosetting resins are free of this defect but are often brittle and lack the toughness required for many uses.

In accordance with this invention, resinous blends are prepared which are at least partially infusible and which are tough and resilient.

In accordance with one aspect of this invention, a thermosetting blend is prepared comprising a uniform admixture of a moldable oxymethylene polymer having successively recurring oxymethylene groups and a material which has a molecular weight not higher than about 1500 and which is capable of reaction with formaldehyde to produce a thermoset resin. The moldable oxymethylene polymer is one which, as compounded, loses less than 40% of its original weight when heated in air at 222° C. for 40 minutes.

Oxymethylene polymers of high molecular weight and of excellent stability and toughness, having successively recurring oxymethylene groups may be readily prepared by the polymerization of trioxane in the presence of boron fluoride and certain boron fluoride complexes. A complete description of the method of preparing such polymers may be found in U.S. Patents 2,989,506 and 2,989,507, issued June 20, 1961.

Oxymethylene copolymers of even greater stability may be prepared by copolymerizing trioxane with from 0.1 to 15 mol percent of a cyclic ether having adjacent carbon atoms. Such copolymers contain randomly dispersed carbon to carbon linkages in the chain. A complete description of such copolymers may be found in U.S. Patent 3,027,352 of Walling et al. Other useful copolymers are disclosed in an article by Kern et al. in "Angewandte Chemie," 73(6), pp. 177 to 186 (Mar. 21, 1961).

In accordance with this invention, such oxymethylene polymers and copolymers are blended with relatively low molecular weight materials capable of reacting with formaldehyde to produce thermoset resins. Materials of molecular weight not higher than about 1500 which are capable of reacting with formaldehyde to produce crosslinked structures are well known in the art. Such materials may comprise simple molecules or may comprise low molecular weight linear polymers.

Materials capable of reacting with formaldehyde to form thermoset resins are discussed at pp. 440 to 458 of "Formaldehyde" by J. Frederick Walker, second edition (1953) Reinhold Publishing Corporation.

The simple molecules which react with formaldehyde to produce thermoset resins are molecules having more than two active hydrogen atoms capable of reaction with formaldehyde. Phenol for example has active hydrogen atoms on the carbon atoms which are ortho and para to the carbon atom attached to the hydroxyl group. Other simple molecules capable of reacting with formaldehyde to produce thermoset resins include substituted phenols, such as resorcinol; molecules having a plurality of amino groups, such as melamine and molecules having a plurality of amide groups, such as urea.

In addition, low molecular weight linear polymeric materials having active hydrogen atoms can react with formaldehyde to produce thermoset materials. Linear phenol-formaldehyde resins made by the condensation of phenol with formaldehyde at a phenol to formaldehyde ratio greater than 1 are particularly useful. Such linear resins are called novolacs.

In accordance with this invention, the formaldehyde reactable material is blended with the oxymethylene polymer in proportions from about 5 to about 80 weight percent based on the total weight of the blend of the two materials.

In order to achieve optimum properties the proportion of formaldehyde reactable material should be from about 15 to about 70 weight percent.

The thermosetting blend is usually prepared by dry mixing the oxymethylene polymer, in the form of powder or pellets, with the formaldehyde reactable material, which is also in dry state. The premixture is kneaded at an elevated temperature (about 150 to 200° C.) in a plastigraph mixer, hot roll mixer, or Banbury mixer. As the mixing occurs, the reaction proceeds. If the reaction is maintained for a sufficient period to reach completion, a non-fluid, friable thermoset powder is obtained.

Ordinarily the reaction is not completed in the mixer but is terminated while the blend is still processable.

The time of mixing depends upon a nature of the resin, the nature of the formaldehyde reactable material and the proportions. Generally, the time of mixing may vary from about 5 to about 60 minutes.

Usually, the partially reacted blend is molded by conventional compression molding, injection molding or extrusion techniques to the desired shape and the crosslinking reaction is completed when the article has attained its final shape. If desired, the intimate powder mix may be placed in a mold and subjected to the desired temperature and pressure for molding without further blending by the kneading step described above.

While it is not desired to be bound by any particular theory of operation, it is believed that the thermosetting properties of the blend of this invention are achieved by reaction of the formaldehyde reactable material with formaldehyde produced by partial decomposition of the high molecular weight oxymethylene polymer. The formaldehyde produced by such partial decomposition is immediately taken up by the formaldehyde reactable material and condenses therewith to form a crosslinked space polymer having chains linked to each other by methylene groups. This crosslinked space polymer is in intimate admixture with the bulk of the oxymethylene polymer which has not decomposed. The crosslinked formaldehyde polymer lends support to the oxymethylene polymer at high temperatures when the latter polymer would otherwise melt. The oxymethylene polymer contributes to the toughness of the blend.

In some cases, the formaldehyde reactable material may be one which does not initiate reaction with formaldehyde by heat alone. In such cases, a catalyst, and particularly a basic catalyst may be provided. Such catalysts are well known in the art and include ammonia, amines, barium hydroxide, sodium hydroxide and ethanolamine. When a basic catalyst is used, it is preferred that the oxymethylene polymer be a copolymer containing carbon-to-carbon bonds in the polymeric chain. The preferred copolymers are copolymers containing interspersed oxyethylene units in amounts from 0.1 to about 15 mol percent.

Oxymethylene polymer chains having ester or ether end groups are also of enhanced thermal stability and suitable for use in this invention. Such polymers are also disclosed in the above cited Kern et al. article.

Another advantageous method of preparing the thermosetting blends of this invention involves the melting of the oxymethylene polymer by itself followed by the addition of formaldehyde reactable material to the already melted resin. In this way the blending time is reduced to a minimum and the reaction between the formaldehyde reactable material and the formaldehyde degradation product is held to a minimum during premixing.

EXAMPLE I

A dry blend was prepared of 20 parts of resorcinol and 80 parts of polyoxymethylene homopolymer having acetyl end groups and stabilized with a synthetic linear polyamide and with 4,4'-butylidene bis-(6-tertiary butyl-3-methyl phenol) to a thermal degradation rate (at 222° C. in air) of .02 weight percent per minute. The blend was placed in a mixer chamber having a pair of counter rotating shallow screws and heated at 190° C. for a period of 15 minutes. At the end of this time, the blend was no longer plastic but had formed a non-fluid "wad." A Bunsen flame applied to this "wad" did not melt it.

EXAMPLE II

A mixture of 66 parts of resorcinol and 33 parts of the oxymethylene homopolymer of Example I was blended in the mixer of Example I for 28 minutes at 180° C. At the end of this mixing the material was powdery and non-fluid.

EXAMPLE III 10 parts by weight of a linear phenol formaldehyde novolac resin (prepared from 0.85/1 molar ratio of formaldehyde to phenol) and 90 parts of the oxymethylene homopolymer of Example I was heated at about 180° C. for 10 minutes. A crosslinked polymer resulted.

A crosslinked polymer did not result when the homopolymer was melted before the addition of the linear phenol-formalehyde polymer and the heating after addition was limited to the period necessary to obtain a homogeneous mixture.

EXAMPLE IV 50 parts by weight of the phenol-formaldehyde resin of Example IV and 50 parts by weight of the oxymethylene homopolymer of Example I were blended in the mixer of Example I at 180° C. for 10 minutes. A thermoset resin was formed.

EXAMPLE V 95 parts by weight of an oxymethylene copolymer containing 2 weight percent of oxyethylene units derived from ethylene oxide was dry-blended with 5 parts of resorcinol.

The copolymer contained 0.5 weight percent of 2,2'-methylene-bis-(4-methyl-6-tertiary butyl phenol) and 0.1 weight percent of cyanoguanidine. The dry mixture was heated at 185° C. for 15 minutes. At the end of this time the mixture was cooled and ground into powder and compression molded at 190° C. and 6500 pounds per square inch for 4 minutes. A disc of 1½" circumference and ⅛" thickness was formed. The disc was tough and could not be broken by hand. When the molded disc was subjected to the heat of a Bunsen flame it melted only partially. A disc control, similar except that it was molded from the copolymer without resorcinol completely melted in a Bunsen flame.

It is to be understood that the foregoing detailed description is given merely by way of illustration and that many variations may be made therein without departing from the scope of my invention.

Having described my invention what I desire to secure by Letters Patent is:

1. A thermosetting blend capable of forming a tough, resilient product comprising a uniform admixture of a stable, moldable oxymethylene polymer of high molecular weight having successively recurring oxymethylene groups which loses less than 40% of its original weight when heated in air at 222° C. for 40 minutes, and from about 15 to about 70 weight percent based on the total weight of the blend of a phenolic novolac having a molecular weight not greater than about 1500 and having at least three reactive hydrogen atoms which is capable of reaction with formaldehyde to produce a thermoset resin.

2. The thermosetting blend of claim 1 wherein the stable, moldable oxymethylene polymer has successively recurring oxymethylene groups and interspersed groups with carbon-to-carbon linkages.

3. The thermosetting blend of claim 2 wherein said interspersed groups are oxyethylene groups.

4. The thermosetting blend of claim 1 wherein said phenolic novolac is a linear phenol-formaldehyde resin prepared from a 0.85/1 molar ratio of formaldehyde to phenol.

5. A method of producing a tough molded article which is resistant to deformation at high temperatures comprising the steps of blending a stable, moldable oxymethylene polymer of high molecular weight having successively recurring oxymethylene groups which loses less than 40% of its original weight when heated in air at 222° C. for 40 minutes with from about 15 to about 70 weight percent, based on the total weight of the blend, of phenolic novolac having a molecular weight not greater than about 1500 and having at least three reactive hydrogen atoms which is capable of reaction with formaldehyde to produce a thermoset resin; molding said blend; and maintaining said molded blend at an elevated temperature until a cross-linked resin is formed.

6. The method of claim 5 wherein said phenolic novolac is a linear phenol-formaldehyde resin prepared from a 0.85/1 molar ratio of formaldehyde to phenol.

References Cited

UNITED STATES PATENTS

| 2,810,708 | 10/1957 | Kubico | 260—45.9 |
| 2,871,220 | 1/1959 | MacDonald | 260—45.9 |
| 2,893,972 | 7/1959 | Kubico | 260—45.9 |
| 2,936,298 | 5/1960 | Hudgin | 260—45.9 |
| 3,131,165 | 4/1964 | Dieter | 260—45.9 |
| 3,210,309 | 10/1965 | Baker | 260—838 |
| 3,219,630 | 11/1965 | Sidi | 260—838 |

MURRAY TILLMAN, *Primary Examiner.*

P. LIEBERMAN, *Assistant Examiner.*